US007280600B2

(12) United States Patent
Orhand et al.

(10) Patent No.: US 7,280,600 B2
(45) Date of Patent: Oct. 9, 2007

(54) BLOCKWISE CODING PROCESS, OF MPEG TYPE, IN WHICH A RESOLUTION IS ASSIGNED TO EACH BLOCK

(75) Inventors: Anita Orhand, Rennes (FR); Edouard Francois, Bourg des Comptes (FR); Dominique Thoreau, Cesson Sévigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 484 days.

(21) Appl. No.: 10/086,603

(22) Filed: Feb. 28, 2002

(65) Prior Publication Data

US 2002/0131507 A1   Sep. 19, 2002

(30) Foreign Application Priority Data

Mar. 14, 2001   (FR) .................................. 01 03454

(51) Int. Cl.
    *H04N 7/12* (2006.01)
(52) U.S. Cl. ................................. 375/240.24
(58) Field of Classification Search ............... 348/390, 348/400, 401, 402, 413, 417, 415, 414, 699, 348/398, 397, 433, 606, 405, 409, 575; 375/240.12, 375/240.16, 240.21, 240.18, 240.25, 240, 375/240.03, 240.24, 240.01; 382/251, 236, 382/245, 48, 232, 250
See application file for complete search history.

(56) References Cited

U.S. PATENT DOCUMENTS

| 5,481,308 | A  | * | 1/1996  | Hartung et al. ........ 375/240.11 |
| 5,973,739 | A  | * | 10/1999 | Nilsson ...................... 348/397 |
| 6,057,884 | A  | * | 5/2000  | Chen et al. ............ 375/240.16 |
| 6,088,061 | A  | * | 7/2000  | Katata et al. ............. 348/390.1 |
| 6,370,192 | B1 | * | 4/2002  | Pearlstein et al. .......... 375/240 |
| 6,510,177 | B1 | * | 1/2003  | De Bonet et al. ....... 375/240.16 |
| 6,668,018 | B2 | * | 12/2003 | Pearlstein et al. ..... 375/240.12 |
| 6,728,317 | B1 | * | 4/2004  | Demos .................. 375/240.21 |
| 6,778,709 | B1 | * | 8/2004  | Taubman .................... 382/240 |
| 2002/0051488 | A1 | * | 5/2002 | Li .............................. 375/240 |
| 2002/0118743 | A1 | * | 8/2002 | Jiang ..................... 375/240.01 |

* cited by examiner

*Primary Examiner*—Tung Vo
*Assistant Examiner*—Behrooz Senfi
(74) *Attorney, Agent, or Firm*—Joseph J. Laks; Ronald H. Kurdyla

(57) ABSTRACT

The invention relates to a process for coding images transmitted according to the so-called multiresolution technique. According to this process, a step of pixel level processing of so-called mixed blocks of pixels, that is to say those shared between at least one zone of a first resolution and at least one zone of a second resolution, is preformed. A block is thus transmitted, the pixels of whose zone of the first resolution are assigned this first resolution and the pixels of whose zone of second resolution are assigned this second resolution.

19 Claims, 2 Drawing Sheets

BLOCKWISE CODING PROCESS, OF MPEG TYPE, IN WHICH A RESOLUTION IS ASSIGNED TO EACH BLOCK

FIELD OF THE INVENTION

The present invention relates to an MPEG type blockwise coding process.

BACKGROUND OF THE INVENTION

The digital transmission of images requires a considerable transfer of data. Therefore, various coding techniques are used so as to reduce the quantity of data transmitted, thus increasing the speed of transmission and of reading of these images.

Certain techniques, such as the MPEG4 standard, use a so-called multiresolution technique. According to this technique, the coding information in respect of an image is divided into as a first main signal, or "layer", and a second improvement signal, or "layer".

The obtaining of these two layers is explained with the aid of the description of FIG. 1 which is a diagram of a video image coder 10 using the MPEG4 standard.

First, this coder 10 comprises a first branch 11 receiving a signal 12 of an image $12_i$ to be coded.

A first processing of the signal 12 consists in subtracting from this signal 12 the information already transmitted in respect of a previous image $12_j$. This inter-image processing is applied when the image $12_i$ is coded with the aid of information contained in the previous image $12_j$.

This operation is performed with the aid of a subtractor 14 which for this purpose receives a signal 34 corresponding to the information transmitted in respect of the previous images. The obtaining of this signal 34 is described subsequently.

Thus, the signal 12 is transformed into a signal $16_{14}$, the latter then being directed to a transformer 18.

This transformer 18 transforms the signal $16_{14}$, defined in the spatial domain, into a signal $16_{18}$ defined in the frequency domain. This operation, which is performed without loss of information, is a discrete cosine transform or DCT.

The signals $16_{18}$ are transmitted to a quantizer 20 which reduces the dynamic range of these signals by determining their quantization interval. This quantization involves approximations causing a non-negligible loss of information of the signal $16_{18}$. The information thus lost during this quantization operation is referred to as the residual, whereas the information retained after quantization constitutes the main layer.

Stated otherwise, the main information layer comprises the data received by the coder minus this residual.

The residual is transmitted by the improvement layer as described subsequently.

A coder 22, for example a Huffman coder, allows a further reduction in the quantity of information to be transmitted.

On exit from the quantizer 20, the signal $16_{20}$ is also transmitted to a subtraction loop, which comprises an inverse quantizer 24 performing the inverse function of the quantizer 20. This inverse quantization operation is performed without any new loss of information.

A signal $16_{24}$ is then obtained which is applied to a converter 26 performing the inverse function (IDCT) of that carried out by the transformer 18, that is to say converting this signal $16_{24}$ from the frequency domain to the spatial domain, thus delivering a signal $16_{26}$ at its output.

This signal $16_{26}$ is transmitted to a memory 28 and a motion estimator 30, then to the subtractor 14.

The signal $16_{24}$ is also transmitted to a subtractor 36, forming part of a branch 35 for processing the improvement layers. A second input of the subtractor 36 receives the output signal $16_{18}$ from the DCT transformer 18.

This subtractor 36 therefore performs the subtraction between signals representing the signals received $16_{18}$ and transmitted $16_{24}$. Thus, the residual $16_{36}$ is obtained at the output of the subtractor 36.

The branch 35 includes a memory 38 which stores the residuals (in the spatial frequency domain) as frames and a device 40 which performs the splitting into improvement planes of the signal $16_{38}$ at the output of the memory 38 according to the standardized so-called "Fine granularity scalability" (FGS) process.

Each of the improvement planes comprises residual data which are complementary to one another and to those transmitted by the main layer. These planes are ranked by priority according to the improvement of the resolution that their transmission engenders.

For example, consider the reception of an image I composed of a main layer $C_1$ and of an improvement layer $C_2$ comprising three planes $P_1$, $P_2$ and $P_3$ such that $P_1$ has priority over $P_2$, the latter having priority over $P_3$.

So, on reception of the main layer $C_1$, this image I can be obtained with a specified resolution. If the improvement layer transmits the improvement plane $P_1$, this image will exhibit better resolution. If the improvement layer also transmits the plane $P_2$, the resolution will be even better. The best resolution will be obtained if the plane $P_3$ is also used.

However, the improvement of the resolution is less and less noticeable as the priority of the planes transmitted decreases.

With this process, the higher the resolution of an image the greater the transmission delay or reading delay on account of the increased number of improvement planes transmitted.

This is why, in order to improve the speed of coding, transmission or reading of an image, it is known practice to code with different resolutions—that is to say with different numbers of improvements planes—the various zones of one and the same image.

It is therefore possible to apply different resolutions in respect of the different zones of an image.

The time taken to code, transmit or read an image is therefore reduced by reducing the resolution of zones of the image, referred to as background zones, considered to be less important than other zones, referred to as zones of interest, whose resolution is kept high, that is to say whose residual is transmitted in full.

The term high resolution will be used for the resolution of the zones of interest, that is to say with complete transmission of the residual, and the term low resolution will be used for the resolution of the background zones, that is to say with incomplete transmission of the residual.

For example, in the case of an image representing a bird flying over a totally blue sky background, the resolution of the zone of the image corresponding to the sky can be decreased while retaining a high resolution for the zone of the image relating to the bird without, in theory, impairing the overall quality of the image.

The present invention results from the finding that this processing does not always yield satisfactory results. Specifically, the images thus processed exhibit anomalies of resolution at the boundaries between the zone or zones of interest and the background zone or zones.

The present invention solves this problem. It is based on the observation that the blockwise processing of pixels is unsuitable for the coding of images involving several resolutions.

It is known, in fact, that video data are coded and transmitted as pixel blocks, for example 8*8 blocks for the MPEG2 or MPEG4 standard.

SUMMARY OF THE INVENTION

The invention therefore relates to a process, of the MPEG type, for the blockwise coding of digital video images in which to each block is assigned a specified resolution dependent on a zone in which this block is located, an image comprising at least two zones to which different resolutions are assigned, characterized in that the mixed blocks straddling two zones of different resolutions are detected, and the zone corresponding to each pixel of these mixed blocks is determined so as to allocate the resolution of this specified zone to this pixel.

In one embodiment, the process comprises two processing steps. In a first step, any mixed block of pixels is rebuilt with a low resolution and then, in a second step, use is made of a mask making it possible to allocate the high resolution to each pixel of the zone of highest resolution of the block (previously processed).

By virtue of the invention, the pixels of the background zones of the image are all coded with the same number of improvement layers irrespective of whether these pixels are or are not located in a mixed block.

Likewise, the pixels of the zone of interest are coded with the same resolution irrespective of whether these pixels are located in a block lying wholly in a zone of interest or in a mixed block.

Hence, the same resolution is allocated to all the pixels of the zones of interest and to all the pixels of the background zones, thus eliminating the defects (noted) at the boundaries between these two zones in respect of the known processings in which the same resolution is accorded to all the pixels of a block.

In one embodiment, to define the zones of different resolutions, use is made of an algorithm for image segmentation according to criteria of colours, textures, brightness and/or motion of the pixels.

In one embodiment, the coding of an image being performed by a coding of a base layer and of an improvement layer, at least one zone of low resolution, or background zone, and at least one zone of high resolution, or zone of interest, is allocated to the image, via differences in coding the improvement layers of the pixels lying in these zones.

To determine the improvement layer, according to one embodiment, the difference between the image coded at maximum resolution and the image according to the base layer is determined, this difference constituting a residual used wholly or partly to define the improvement layer.

Furthermore, according to one embodiment, the image is coded via data or coefficients in the frequency domain, for example via a transformation of the cosine transform type, and, to allocate to each pixel of the mixed blocks the resolution which corresponds to its zone, the data of the frequency domain are retransformed into the spatial domain. Then, after the allocation of resolutions, these data are retransformed into the frequency domain.

In one embodiment comprising two steps, the mixed block is allocated the lowest of the resolutions of the zones which it contains in a first step and, in the course of a second step, the resolution of the pixels of this block lying in a zone of higher resolution is increased.

It is also envisaged that, in one embodiment, the lowest resolution be obtained either via the base layer, or via the combination of the base layer with at least one improvement layer.

According to one embodiment, the base layer and the improvement layer being determined separately, the allocation of resolution to the pixels of a mixed block is performed by taking account both of the base layer and of the improvement layer.

In one embodiment, the base layer is subtracted from the mixed block whose pixels are coded according to different resolutions so as to determine the improvement layer of this mixed block.

It is also contemplated that, in one embodiment relating to a mixed block comprising two adjacent zones, one having a first resolution and the other a second resolution greater than the first, pixels of the first zone be assigned at least one intermediate resolution lying between the first and the second resolutions.

In one embodiment, the intermediate resolution(s) is (are) dependent on a quantization interval (PQ) used to code the zones of lowest resolution.

According to one embodiment, the closer the pixels ($P(i,j)$) of the first zone are to the second zone, the more their resolution increases.

Moreover, in one embodiment, an intermediate resolution is allocated to all the pixels of the first zone which are located in the mixed block.

In one embodiment, the intermediate resolution of each pixel of the first zone is a linear function of the distance of this pixel from the second zone.

To perform the detection of the mixed blocks, use is made, according to one embodiment, of a mask (66) reproducing the shape of the zones in such a way as to associate the pixels of the image with a zone and to determine the resolution applied to these pixels. This mask is then modified by allocating values ($v''(i,j)$) lying between the mask values (1) defining a zone of interest and the mask values (0) defining a background zone to the pixels ($P(i,j)$) of the mixed blocks.

In one embodiment, a coefficient $A(i,j)$ calculated according to the formula $$A(i,j)=(PQ/c)+v''(i,j),$$

is allocated to any pixel ($P(i,j)$) situated at a row i and at a column j, where c is a constant and $v''(i,j)$ is the mask value allocated to the pixel $P(i,j)$ by this mask, the resolution $N(i,j)$ of each pixel ($P(i,j)$) of a mixed block then being equal to:

$$N(i,j)=A(i,j) \cdot Z_{in}(i,j)+(1-A(i,j)) \cdot (Z_{fd}(i,j))$$

where $Z_{fd}(i, j)$ represents the resolution allocated to the background zone where this pixel $P(i,j)$ was located and $Z_{in}(i,j)$ represents the resolution allocated to the zone of interest neighbouring this background zone.

The invention also relates to any image, of the MPEG type, from blockwise coding, which image is obtained by a coding process according to any one of the above embodiments.

Likewise, the invention relates to any medium containing images obtained by a coding process according to any one of the previous embodiments.

Furthermore, the invention pertains to a digital video signal coding an image and obtained with the aid of a process according to any one of the previous embodiments.

The process can also be described on the basis of the terms commonly employed for MPEG coding. The image block after inverse quantization is referred to as the reconstructed coefficient block, hence in the frequency domain, the reconstructed coefficient block, after inverse transformation, is referred to as the image block or reconstructed pixel block, hence in the spatial domain. The resolution of a coefficient block relates to the resolution of coding corresponding for example to the value of the quantization interval, the resolution of a reconstructed pixel block depends also on this quantization interval. The invention thus relates to a process for the blockwise coding of images, of MPEG type, of a source image, comprising a coding of the base layer and a coding of an improvement layer, characterized in that the improvement layer is obtained through the following steps:

calculation of a low-resolution pixel block, of specified resolution less than that of a source block, selection of pixels from among a block of the source image and the corresponding low-resolution pixel block, as a function of a mask, transformation performed on the resulting pixel block so as to yield a coefficient block, subtraction of the resulting coefficient block from the reconstructed coefficient block relating to the base layer, so as to yield a coefficient block relating to the improvement layer.

In a particular manner, the low-resolution pixel block is the reconstructed pixel block relating to the base layer.

In a particular manner, the low-resolution pixel block is obtained by performing:

a subtraction between the block of nonquantized coefficients relating to the base layer and the reconstructed coefficient block relating to the base layer, a selection of the resolution of the block thus obtained by selecting a bit plane so as to obtain an intermediate block, an addition of the intermediate block to the reconstructed coefficient block relating to the base layer, an inverse transformation on the block thus obtained.

BRIEF DESCRIPTION OF THE DRAWINGS

Other characteristics and advantages of the invention will become apparent with the description of certain of its embodiments, this being given by way of nonlimiting example while referring to the appended drawings in which.

DETAILED DESCRIPTION OF PREFERRED EMBODIMENTS

Figure 2:
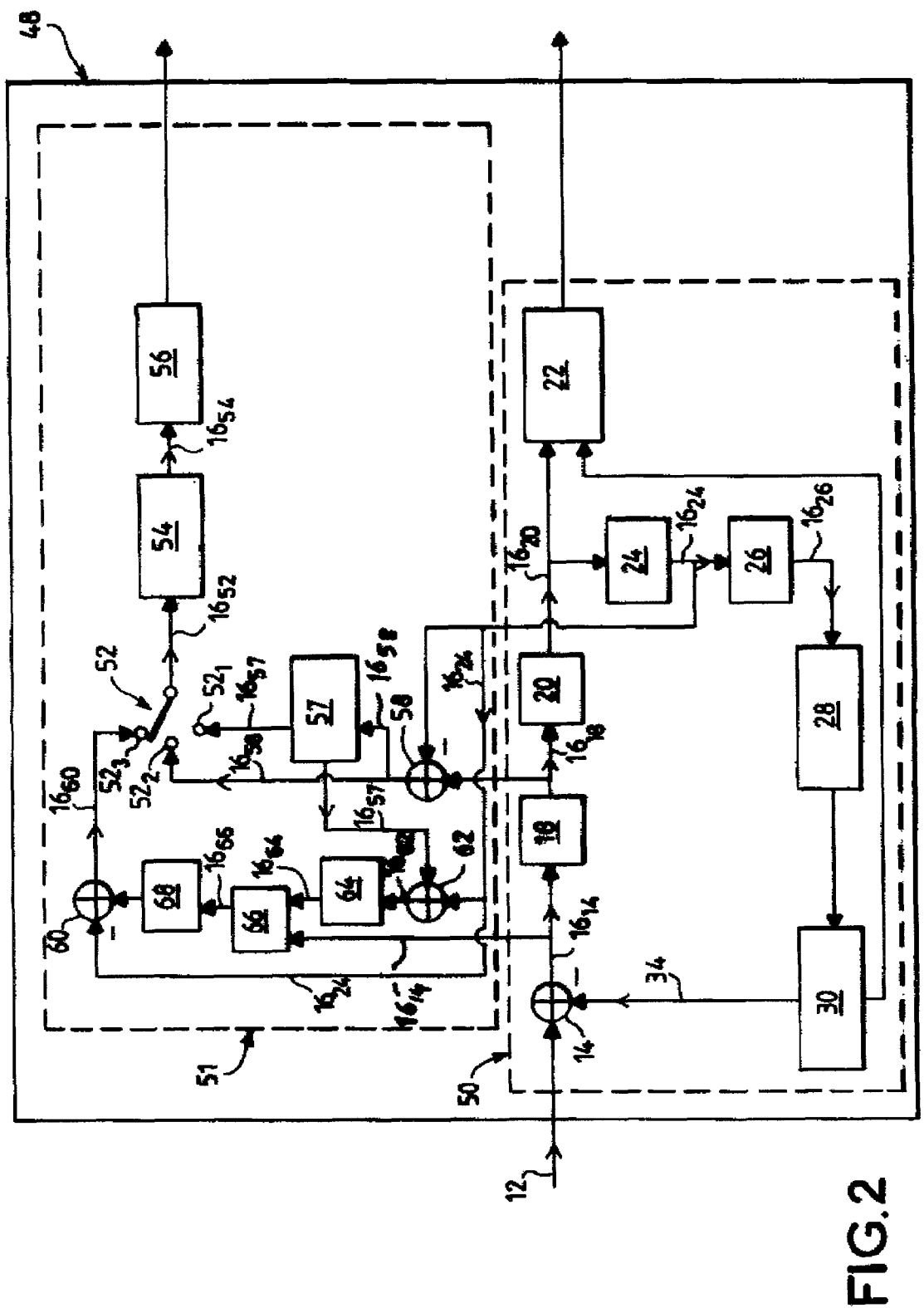
FIG. 2 is a diagram representing a coding process in accordance with the invention.

Represented in this FIG. 2 is a coder 48 composed of two parts or branches 50 and 51.

The branch 50 of this coder is identical to the branch 11 of the coder 10. Hence, the same references will be used for identical parts.

On the other hand, the branch 51 exhibits differences with respect to the branch 35 of the coder 10, in particular a device which makes it possible to code with a different number of improvement planes the pixels lying in a zone of interest of an image and pixels lying in a background zone of this same image.

In accordance with the invention, this coding is applied also to the pixels present in a mixed block, that is to say one comprising pixels of at least one zone of interest and pixels of at least one background zone.

The branch 51 of the coder 48 comprises a demultiplexer 52 placed upstream of the memory 54 identical to the memory 38 of the coder 10. The demultiplexer or switch 52 makes it possible to transmit, according to its position, to the memory 54 the signals emanating from pins $52_1$, $52_2$ and $52_3$.

This demultiplexer 52 transmits to the memory 54, signals originating from various sources according to the location of the pixel blocks coded by the signals transmitted. Downstream of the memory 54, there is provided a splitting device 56 similar to the device 40 of FIG. 1.

Firstly, when the entire coded pixel block is situated in a background zone, the demultiplexer links the pin $52_1$ to the memory 54.

In this case, the signals $16_{57}$ of the block transmitted by this switch 52 originate from a controller 57 of the number of planes which reduces the number of improvement planes used to code the residual of a pixel block thus processed.

Figure 1:
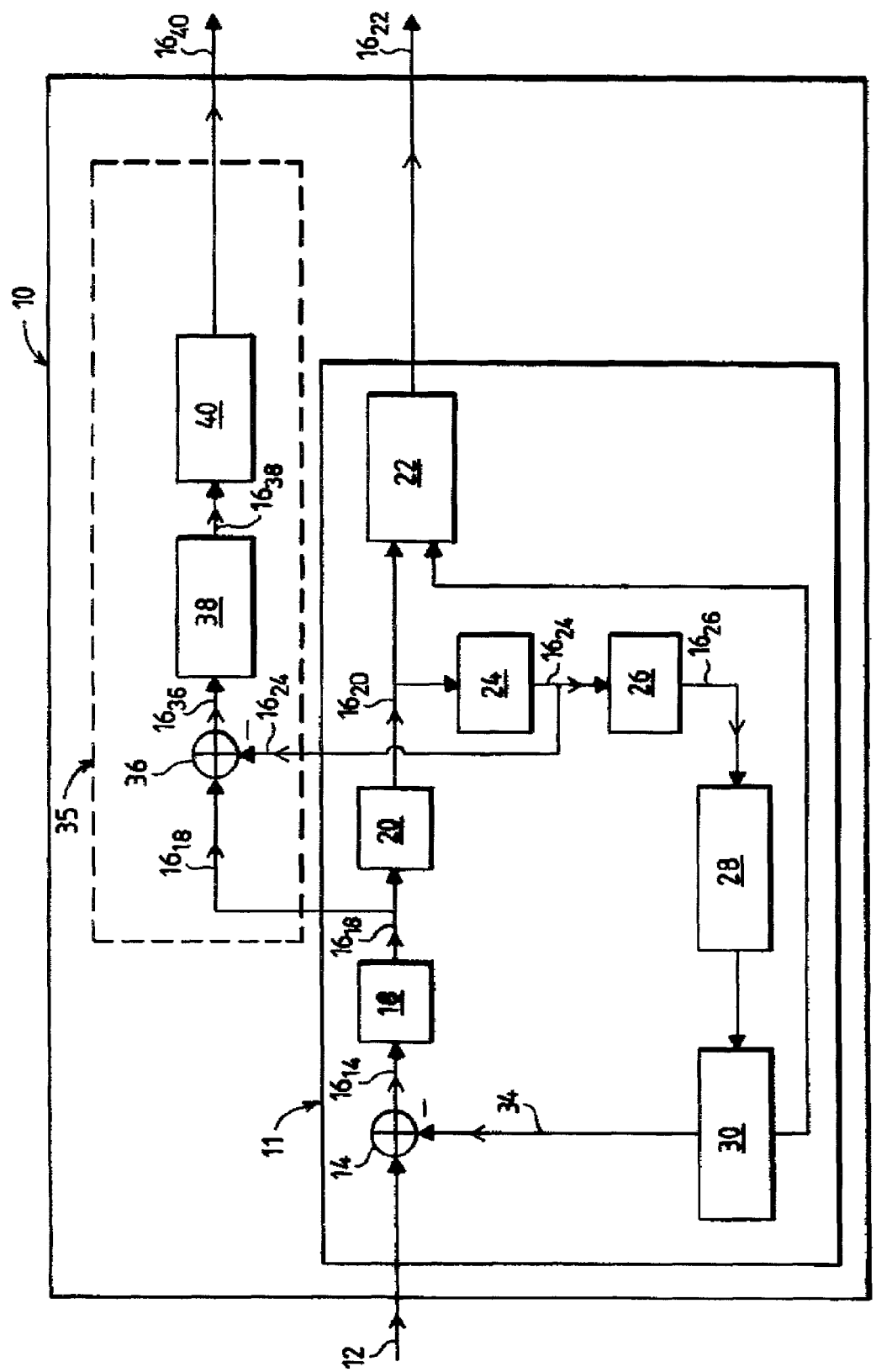
FIG. 1, already described, is a diagram representing a known coding process according to the MPEG 4 standard.

The controller 57 receives the residual from a subtractor 58, similar to the subtractor 36 of FIG. 1.

The pixels provided by the controller 57 correspond to a background zone.

The pixels lying in a block inside a zone of interest are transmitted by the pin $52_2$ which receives directly the signals $16_{58}$ transmitted by the subtractor 58.

The improvement layer is therefore transmitted fully in respect of the pixels lying in a block situated inside a zone of interest. This transmission is similar to the transmission described previously with the aid of FIG. 1 corresponding to the conventional multiresolution coding diagram.

When a pixel block comprises pixels of a zone of interest and pixels of a background zone, these pixels are transmitted by the pin $52_3$.

The latter receives signals $16_{60}$ whose resolution, for one and the same block, is the background resolution for the pixels forming part of the background zone, and is the resolution of the zone of interest for the pixels forming part of a zone of interest.

For the coding of a mixed block, the signal $16_{58}$ which represents the residual of this mixed block is used first.

Next, this signal $16_{58}$ is transmitted to the controller 57 which performs a reduction of the number of improvement planes for all the pixels of the block represented by this signal $16_{58}$. This controller 57 applies the same resolution to this mixed block as to a background block and outputs a signal $16_{57}$ coding for the reduced residual improvement layers.

The information transmitted by this signal $16_{57}$ is then combined with the information emanating from the inverse quantizer 24.

For this purpose, a combining device 62 is used which, after receiving the signals $16_{57}$ and $16_{24}$, delivers a signal $16_{62}$ combining the information transmitted by these signals $16_{57}$ and $16_{24}$.

It is recalled here that the signal $16_{24}$ represents the base layer and the signal $16_{57}$ represents the low-resolution residual, these signals being in the frequency domain.

Thus, by means of this device 62, a signal $16_{62}$ is created in the frequency domain corresponding to an image having a background resolution for all the component pixels of the 8*8 block.

This signal $16_{62}$ is then converted into the spatial domain by virtue of a transformer 64 which performs the IDCT (inverse DCT) operation and which transmits this new signal to a facility 66.

Moreover, this facility 66 also receives high-resolution signals provided by the input signal $16_{14}$ upstream of the DCT transformation 18.

On the basis of these high-resolution signals $16_{14}$ and low-resolution signals $16_{64}$, it is possible to apply a mask so as to allocate a high resolution to the pixels lying in the zone of interest and a low resolution to the pixels lying in a background zone of one and the same mixed block.

This mask is obtained beforehand via a so-called image segmentation operation making it possible to isolate one or more shapes in an image. For this purpose, these mask use, for example, shape recognition algorithms based on criteria of colours, textures and/or motion. These algorithms perform image segmentations in the spatial domain with a pixel scale precise resolution. These segmentations may correspond to zones or to objects represented in the image.

Such algorithms are described for example in the publication by B. Chupeau and E. Francois entitled "Region-based Motion Estimation for Content-based Video Coding and Indexing", Proc. Int. Conf. on Visual Communication and Image Processing, Perth, Australia, Vol. SPIE 4067, pp. 884-893, 2000.

Thus, the signal $16_{66}$ delivered by the composition facility 66 (using the mask) yields a mixed block comprising pixels of the zone of interest, the whole of whose improvement layer is transmitted, and background pixels, whose resolution is reduced.

Next, this block is transformed by a new DCT transformation 68, then the transmitted layer—represented by the signal $16_{24}$—is subtracted from it with the aid of a subtractor 60 so as to obtain a signal $16_{60}$.

This signal $16_{60}$ therefore clearly represents the residual of the pixels of interest in its entirety whereas the residual of the background pixels is reduced to a lesser resolution, allowing a lower number of bits for the image.

All the background pixels have the same resolution. Likewise, all the pixels of the zone of interest have the same resolution, this despite the presence of mixed blocks. The anomalies of resolution are therefore eliminated, in the sense that the boundary between zones or objects is perfectly complied with in regard to the various levels of resolution.

The invention is open to numerous variants. For example, it is possible to limit the number of improvement planes in respect of the pixels belonging to the zone of interest. Moreover, several zones of interest, shapes or objects can be considered.

Likewise, several types of zones can be used.

Thus, by using a controller of planes similar to the controller 57 before the image masking operation 66, it is possible to define a mean level of resolution, between the two resolution levels previously defined. This control of planes being performed in the spatial frequency domain, it is necessary to provide a new IDCT transformation dedicated to the zone of interest.

In one variant of the invention, consider a code which differs from the coder previously described by a quantizer having a high quantization interval. By way of example, a quantization interval close to, or greater than, 25 for a coder having a quantization interval varying between 1 and 31 is considered to be high.

In this case, it is found that the images transmitted by this coder exhibit resolution anomalies characterized by the emphasizing of the edges of the pixel blocks situated in background zones.

These anomalies are due to a known phenomenon dubbed the block effect engendered by a deficit of coding of the high frequencies during the quantization of the DCT coefficients.

This deficit is caused by a high quantization interval which limits the information transmitted by the base layer.

Now, the resolution of the pixels of the background zones is directly dependent on the quantity of information transmitted by the base layer. A high quantization interval therefore engenders block effects to the pixels of the background layer or layers.

Moreover, it should be noted that the resolution of the zones of interest is kept high by means of the planes of the improvement layer.

In this embodiment of the invention, the block effect in proximity to the zones of interest of an image is reduced by improving the resolution of pixels situated in a background zone neighbouring a zone of interest.

In this way the resolution anomalies due to the block effect are reduced in proximity to the zones of interest.

More precisely, the resolution of a zone of pixels situated in a background zone neighbouring a zone of interest is modified in such a way that this modified zone exhibits a gradient of resolution lying between the resolution of the background zone and the resolution of the zone of interest.

This modified zone is here dubbed the gradient zone.

According to this process, the nearer a pixel of the gradient zone is situated to a zone of interest, the higher is its resolution.

Conversely, the nearer a pixel of the gradient zone is situated to a background zone, the more its resolution is decreased.

The block effects in proximity to the zone of interest are thus reduced and the contrast between the background zone and the zone of interest is attenuated.

So as to create this gradient zone, a process performed with the aid of a facility similar to the composition facility 66 described previously is used.

The description of this process is given below by considering, for example, an image comprising a single zone of interest and a single background zone, these zones being defined by a mask.

This example is described in a single dimension for greater clarity, an embodiment with several dimensions being deducible by analogy.

To describe this process, it should be recalled that a mask comprises values allocated specifically to each pixel of an image processed by this mask.

For this purpose, a value $v(i,j)$ of row i and column j of the mask is associated with a pixel $P(i,j)$ of row i and column j of the image processed by this mask.

This value $v(i,j)$ of the mask then characterizes a property of the pixel $P(i,j)$ associated with this value $v(i,j)$.

In the example, the mask used associates a value 1 with the pixels lying in a zone of interest and a value 0 with the pixels lying in a background zone.

Thus, the composition facility determines the image pixels in respect of which different resolutions are applied.

In a first step of the process, a dilatation of the zone of interest defined by this mask is performed.

More precisely, the value 0 allocated by the mask to certain pixels of the background zone is modified to a zone of interest value 1 so as to widen the extent of the zone of interest defined by this mask.

For this purpose, use is made of a filter which modifies the values v(i,j) of the mask as follows:

When this filter is centred on a value 0 of the mask corresponding to a pixel of a background zone, this central value is modified by allocating a zone of interest value 1 to this central value if this filter overlaps another zone of interest value 1.

Consider for example a one-dimensional filter extending over five values.

Then consider a part of the mask comprising values v(i,j) in one dimension as indicated below:

| 1 1 1 1 1 1 1 1 | 1 0 0 0 0 0 0 0 | 0 0 0 0 0 0 0 0 |

The first block of values (1 1 1 1 1 1 1 1) of the mask defines a zone of interest extending over eight pixels of the image, the second block of values (1 0 0 0 0 0 0 0) defines a zone of interest "tied to the first" extending over a pixel and a background zone neighbouring this zone of interest extending over seven pixels of the image, and the third block (0 0 0 0 0 0 0 0) defines a background zone extending over eight pixels neighbouring the background zone previously identified.

It is found that when the filter is centred on each of the 0 values corresponding to a background zone, two 0 values of the intermediate block (1 0 0 0 0 0 0 0) are modified according to the process described.

More precisely, the two diagrams below show these two operations.

First modification:

| 1 1 1 1 1 1 1 1 | 1 <u>0</u> 0 0 0 0 0 0 | 0 0 0 0 0 0 0 0 |

The filter

is centred on a value v(i,j) <u>0</u> of the block (1 <u>0</u> 0 0 0 0 0 0), this value <u>0</u> neighbouring the value 1 of this same block.

As the filter extends over five values, it covers two values on each side of this central <u>0</u> value.

Therefore, the filter

covers the value <u>1</u> situated in the block (1 1 1 1 1 1 1 <u>1</u>) and the value <u>1</u> situated in the same block (<u>1</u> <u>0</u> 0 0 0 0 0 0) as the value <u>0</u> at the centre of the filter.

The central value <u>0</u> of the mask then becomes a value 1 since the filter extends over at least one value 1.

Second modification:

| 1 1 1 1 1 1 1 1 | 1 0 <u>0</u> 0 0 0 0 0 | 0 0 0 0 0 0 0 0 |

The filter

is centred on a value <u>0</u> of the block (1 0 <u>0</u> 0 0 0 0 0), this value <u>0</u> being the closest to the value 0 previously studied.

As the filter

extends over five values, it covers the value <u>1</u> situated in the same block (<u>1</u> 0 <u>0</u> 0 0 0 0 0) as the value <u>0</u> at the centre of the filter.

The central value <u>0</u> is then modified into a value 1.

So, after dilatation, the values v'(i,j) of this part of the mask are:

| 1 1 1 1 1 1 1 1 | 1 <u>1 1</u> 0 0 0 0 0 | 0 0 0 0 0 0 0 0 |

It is found that, in this case, the zone of dilatation extends over two values. Thus, this modified part of the mask dilates the zone of interest over two pixels of the image.

Subsequently, a modification of the values v'(i,j) of the dilated mask is performed in such a way as to allocate values v''(i,j) lying between the value 1 of the zone of interest and the value 0 of the background interest.

For this purpose, a second one-dimensional filter

with five values is applied to this mask, and can modify the value on which this filter is centred.

Thus, this filter allocates a new value to the central value, equal to the algebraic mean of the values covered by this filter.

The diagram below shows this operation for a value <u>1</u> of the second block (1 <u>1</u> 1 0 0 0 0 0):

| 1 1 1 1 1 1 1 1 | 1 <u>1</u> 1 0 0 0 0 0 | 0 0 0 0 0 0 0 0 |

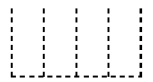

The filter

is centred on a value v'(i,j) 1 of the block (1 1 1 0 0 0 0 0), this value 1 being the value 1 neighbouring the last value 1 of the same block.

The values v'(i,j) covered by the filter are then 1, 1, 1, 1 and 0.

The new value v"(i,j) of the mask for this central value is then the arithmetic mean of these values, i.e.: v"(i,j)=⅘

From the result of the dilatation operation, there is then obtained according to this process a mask part having the following values v"(i,j):

| 1 1 1 1 1 1 1 1 | 1 4/5 3/5 2/5 1/5 0 0 0 | 0 0 0 0 0 0 0 0 |

Thus, when this operation is completed, the mask allocates a value v"(i,j) of 1 to the pixels of the zone of interest, 0 to certain pixels of the background zone and between 0 and 1 to the pixels of the dilatation zone and to certain pixels of the background zone.

In the present case, the zone of pixels characterized by a value intermediate between the value 0 of the background zone and the value 1 of the zone of interest has a width equal to 4 pixels.

Moreover, so as to take into consideration the quantization interval in the determination of the gradient zone, a coefficient A(i,j) specific to each pixel P(i,j) of the mixed blocks of 8*8 pixels is evaluated such that:

$$A(i,j)=(PQ/32)+v''(i,j)$$

where PQ represents the quantization interval used for the coding of the base layer—varying between 1 and 31—and v"(i,j) represents the value allocated by the mask to the pixel P(i,j) after having processed this mask according to the operations described previously " dilatation and filtering.

In the case where PQ/32+v"(i,j) is greater than 1, then A(i,j) is limited to 1.

By considering the mask part studied previously, the values of each of the three blocks (1 1 1 1 1 1 1 1), (1 0 0 0 0 0 0 0) and (0 0 0 0 0 0 0 0) are associated with pixels of 8*8 blocks, these blocks being processed one-dimensionally.

In this case, only the second block of values (1 0 0 0 0 0 0 0) is a block of values which is associated with an 8*8 mixed block of pixels, the block (1 1 1 1 1 1 1 1) and the block (0 0 0 0 0 0 0 0) being associated respectively with 8*8 zone-of-interest and background-zone pixel blocks.

By taking a quantization interval of 16, a coefficient A(i,j) is then calculated for each of the values of the block (1 0 0 0 0 0 0 0) such that:

$$A(i,j)=0.5+v''(i,j)$$

A block (1 1 1 0.9 0.7 0.5 0.5 0.5) is then obtained.

Thereupon, a new resolution N(i,j) is defined for each pixel P(i,j) associated with one of the values of this block as:

$$N(i,j)=A(i,j)\cdot Z_{in}(i,j)+(1-A(i,j))\cdot(Z_{fd}(i,j))$$

where $Z_{in}(i,j)$ represents the resolution allocated to the zone of interest and $Z_{fd}(i,j)$ represents the resolution allocated to the background zone.

Thus, a mean resolution lying between a background zone resolution and a zone of interest resolution is defined for each pixel P(i,j) initially situated in a background zone of an 8*8 mixed pixel block, these two resolutions being weighted by a factor relating to the quantization interval and to the position of the pixel P(i,j) with respect to the zone of interest.

It can be seen that all the pixels of a mixed 8*8 block initially lying in a background zone have a resolution intermediate between the resolution of the background zone and the resolution of the zone of interest.

They form the gradient zone defined previously.

Moreover, it should be noted that when the block effects are improbable, the process in accordance with the invention substantially decreases the quantity of information to be transmitted for the pixels of the gradient zone.

Thus, in another example, a background zone coded with a quantization interval of 4 is considered; in this case, the block effects can be considered to be improbable since the resolution is high.

Moreover, following the process according to the invention and considering the part of the previously studied mask, coefficients A'(i,j) equal to (1 0.92 0.72 0.52 0.32 0.12 0.12 0.12) are obtained in this example for the values (1 0 0 0 0 0 0 0) associated with a mixed block.

It can be seen that the coefficients A'(i,j) are on average smaller than the coefficients A(i,j) of the previous example.

The resolution of the background zone is therefore much smaller in this second case.

Stated otherwise, the quantity of information transmitted in respect of the gradient zone is less than in the previous example, thus taking into account the fact that block effects are less probable in this second case.

It is important to stress that the embodiments described apply to any type of image processing performed with the aid of groupings of pixels to which various resolutions are applied. Thus in the examples described above, the groupings of pixels consist of blocks; but as a variant, processing operations can also be performed on shapes or objects. Hence, in the foregoing and in what follows (in particular the claims), the term "block" should be understood as signifying, generally, a grouping of pixels.

What is claimed:

1. Process for the blockwise coding of digital video images in which to each block is assigned a specified resolution dependent on a zone in which this block is located, an image comprising at least two zones to which different resolutions are assigned, an image being coded by using transformation of blocks from the spatial domain to the frequency domain, characterized in that the mixed blocks straddling two zones of different resolutions are detected, said mixed blocks are constructed by determining the zone corresponding to each pixel of these mixed blocks and by allocating the resolution of this specified zone to this pixel to get constructed mixed blocks and said constructed mixed blocks are transformed in the frequency domain, in that the image is coded via data or coefficients in the frequency domain, and in that to allocate to each pixel of the mixed blocks the resolution which corresponds to its zone, the data of the frequency domain are quantized, dequantized before being used for a retransformation into the spatial domain.

2. Process according to claim 1, characterized in that to define the zones of different resolutions, use is made of an algorithm for image segmentation according to criteria of colours, textures, brightness and/or motion of the pixels.

3. Process according to claim 1, characterized in that, the coding of an image being performed by a coding of a base layer and of an improvement layer, at least one zone of low resolution, or background zone, and at least one zone of high resolution, or zone of interest, is allocated to the image, via differences in coding the improvement layers of the pixels lying in these zones.

4. Process according to claim 3, characterized in that to determine the improvement layer, the difference between the image coded at maximum resolution and the image according to the base layer is determined, this difference constituting a residual used wholly or partly to define the improvement layer.

5. Process according to claim 3, characterized in that, the base layer and the improvement layer being determined separately, the allocation of resolution to the pixels of a mixed block is performed by taking account both of the base layer and of the improvement layer.

6. Process according to claim 5, characterized in that the improvement layer of the mixed block is determined by deducting the base layer from this mixed block whose pixels are coded according to different resolutions.

7. Process according to claim 1, characterized in that, in a first step, the mixed block is allocated the lowest, Of the resolutions of the zones which it contains and that in the course of a second step, the resolution of the pixels of this block lying in a zone of higher resolution is increased.

8. Process according to claim 3, characterized in that the lowest resolution is obtained either via the base layer, or via the combination of the base layer with at least one improvement layer.

9. Process according to claim 7, characterized in that the lowest resolution is obtained either via the base layer, or via the combination of the base layer with at least one improvement layer.

10. Process according to claim 1, characterized in that in a mixed block comprising two adjacent zones, one having a first resolution and the other a second resolution greater than the first, pixels of the first zone are assigned at least one intermediate resolution lying between the first and the second resolutions.

11. Process according to claim 10, characterized in that the intermediate resolution(s) is (are) dependent on a quantization interval (PQ) used to code the zones of lowest resolution.

12. Process according to claim 10, characterized in that the closer the pixels (P(i,j)) of the first zone are to the second zone, the more their resolution increases.

13. Process according to claim 10, characterized in that an intermediate resolution is allocated to all the pixels of the first zone which are located in the mixed block.

14. Process according to claim 12, characterized in that the intermediate resolution of each pixel of the first zone is a linear function of the distance of this pixel from the second zone.

15. Process according to claim 13, characterized in that the intermediate resolution of each pixel of the first zone is a linear function of the distance of this pixel from the second zone.

16. Process according to claim 10, characterized in that, for the detection of the mixed blocks, use is made of a mask (66) reproducing the shape of the zones in such a way as to associate the pixels of the image with a zone and to determine the resolution applied to these pixels and in that this mask is modified by allocating values (v"(i,j)) lying between the mask values (1) defining a zone of interest and the mask values (0) defining a background zone to the pixels (P(i,j)) of the mixed blocks.

17. Process according to claim 16, characterized in that a coefficient A(i,j) calculated according to the formula $$A(i,j)=(PQ/c)+v''(i,j),$$

is allocated to any pixel (P(i,j)) situated at a row i and at a column j, where c is a constant and v"(i,j) is the mask value allocated to the pixel P(i,j) by this mask, the resolution N(i,j) of each pixel (P(i,j)) of a mixed block then being equal to:

$$N(i,j)=A(i,j)\cdot Z_{in}(i,j)+(1-A(i,j))\cdot(Z_{fd}(i,j))$$

where $Z_{fd}(i,j)$ represents the resolution allocated to the background zone where this pixel P(i,j) was located and Zin(i,j) represents the resolution allocated to the zone of interest neighbouring this background zone.

18. Image, of the MPEG type, from blockwise coding, which image is obtained by a coding process according to claim 1.

19. Coded digital video signal of an image, which signal is obtained with the aid of a process according to claim 1.

* * * * *